US012736865B2

(12) United States Patent
Chien et al.

(10) Patent No.: US 12,736,865 B2
(45) Date of Patent: Sep. 15, 2026

(54) ILLUMINATION SYSTEM AND PROJECTION APPARATUS

(71) Applicant: Qisda Corporation, Taoyuan City (TW)

(72) Inventors: Chih-Shiung Chien, Taoyuan City (TW); Ming-Kuen Lin, Taoyuan City (TW); Tsung-Hsun Wu, Taoyuan City (TW)

(73) Assignee: Qisda Corporation, Taoyuan City (TW)

( * ) Notice: Subject to any disclaimer, the term of this patent is extended or adjusted under 35 U.S.C. 154(b) by 520 days.

(21) Appl. No.: 18/318,736

(22) Filed: May 17, 2023

(65) Prior Publication Data

US 2024/0094615 A1 Mar. 21, 2024

(30) Foreign Application Priority Data

Sep. 15, 2022 (CN) ......................... 202211121397.0

(51) Int. Cl.
*G03B 21/20* (2006.01)

(52) U.S. Cl.
CPC ..... *G03B 21/2066* (2013.01); *G03B 21/2013* (2013.01); *G03B 21/2033* (2013.01); *G03B 21/208* (2013.01)

(58) Field of Classification Search
CPC ............ G03B 21/2066; G03B 21/2013; G03B 21/2033; G03B 21/208; G03B 21/204
USPC ............................................................ 353/99
See application file for complete search history.

(56) References Cited

U.S. PATENT DOCUMENTS

2003/0090900 A1* 5/2003 Kim ..................... H04N 9/3155 348/E9.027
2016/0259234 A1* 9/2016 Akiyama ............. G03B 21/204
2020/0192114 A1* 6/2020 Chen .................. G03B 21/2066

FOREIGN PATENT DOCUMENTS

TW 202014789 A * 4/2020 ............. G03B 21/14

* cited by examiner

*Primary Examiner* — Magda Cruz
(74) *Attorney, Agent, or Firm* — JCIPRNET

(57) ABSTRACT

An illumination system including a first light-emitting unit, a first reflector, a second light-emitting unit, and a second reflector is provided. The first light-emitting unit is configured to emit a first light beam, and the first reflector is configured to reflect the first light beam toward a first direction. The second light-emitting unit is configured to emit a second light beam, and the second reflector is configured to reflect the second light beam toward the first direction. The first reflector and the second reflector are arranged in a second direction. For a view seeing along the second direction, the first reflector and the second reflector form a cross shape. The second direction is perpendicular to the first direction. A projection apparatus is also provided.

18 Claims, 5 Drawing Sheets

ILLUMINATION SYSTEM AND PROJECTION APPARATUS

CROSS-REFERENCE TO RELATED APPLICATION

This application claims the priority benefit of Chinese application no. 202211121397.0, filed on Sep. 15, 2022. The entirety of the above-mentioned patent application is hereby incorporated by reference herein and made a part of this specification.

BACKGROUND

Technical Field

The disclosure relates to a light source and an optical apparatus, and particularly relates to an illumination system and a projection apparatus.

Description of Related Art

As the demand of the user for the brightness of the image provided by the projection apparatus is getting high, the number and wattage of light-emitting elements adopted in the illumination system of the projection apparatus are also increasing, even developing toward the high power laser light source.

In order to improve the brightness of the image, the related art adopts a light combining element to merge the light beams emitted by multiple groups of laser light sources and transmit the same to the light receiving lens. However, when three groups of laser light sources are adopted, the distribution range of the flares of the laser light irradiated on the light receiving lens is large and asymmetrical. Apart from that the brightness uniformity of the image is affected, the flares distributed at the edge of the light receiving lens also lead to poor light efficiency.

On the other hand, when four groups of laser light sources are adopted, the distribution range of the flares of the laser light irradiated on the light receiving lens is symmetrical but large, and there is no light near the optical axis of the light receiving lens, while the flares are close to the edge of the light receiving lens. As a result, the light efficiency of the projection apparatus is poor.

SUMMARY

The disclosure provides an illumination system, which can effectively improve the light efficiency and the illumination uniformity.

The disclosure provides a projection apparatus, which can effectively improve the light efficiency and the brightness uniformity of the image.

An embodiment of the disclosure provides an illumination system, including a first light-emitting unit, a first reflector, a second light-emitting unit, and a second reflector. The first light-emitting unit is configured to emit a first light beam, and the first reflector is configured to reflect the first light beam toward a first direction. The second light-emitting unit is configured to emit a second light beam, and the second reflector is configured to reflect the second light beam toward the first direction. The first reflector and the second reflector are arranged in a second direction, and for a view seeing along the second direction, the first reflector and the second reflector form a cross shape. The second direction is perpendicular to the first direction.

An embodiment of the disclosure provides a projection apparatus, including the illumination system and a light valve. The light valve is disposed on a transmission path of the first light beam from the first reflector and the second light beam from the second reflector to convert the first light beam and the second light beam into an image light beam.

In the illumination system and the projection apparatus of the embodiments of the disclosure, since the first reflector and the second reflector forming a cross shape are adopted, the distribution range of the flares formed by the first reflector and the second reflector after reflecting the first light beam and the second light beam can be effectively reduced, so that the flares are more concentrated, thus improving the light efficiency, and the distribution range of the flares can be made symmetrical, thus uniformizing the illumination and thereby improving the brightness uniformity of the image provided by the projection apparatus.

DESCRIPTION OF THE EMBODIMENTS

Figure 1A:
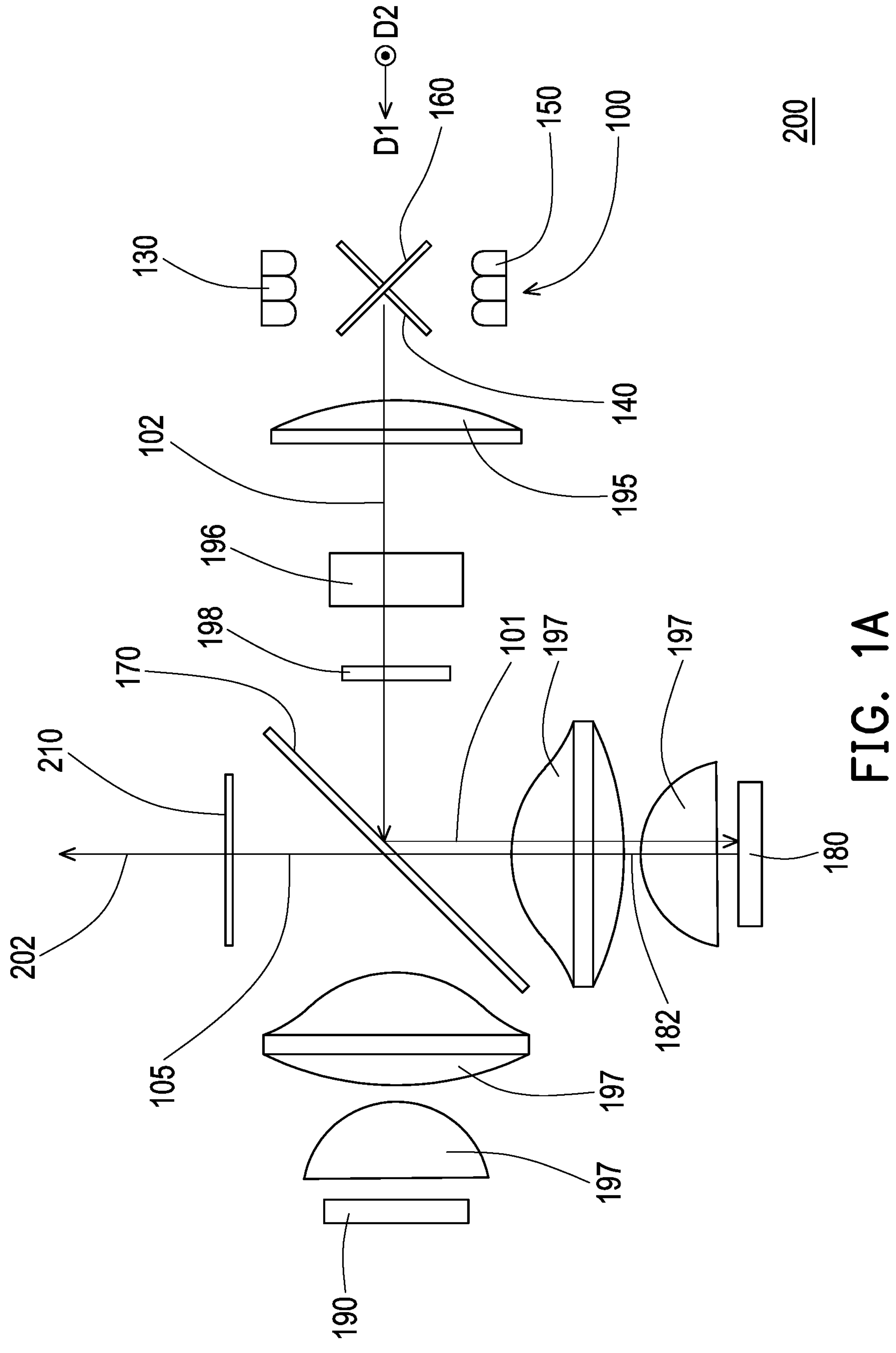
FIG. 1A is a schematic diagram of a structure of a projection apparatus according to an embodiment of the disclosure, which illustrates a light path of a conversion light beam.
Figure 1B:
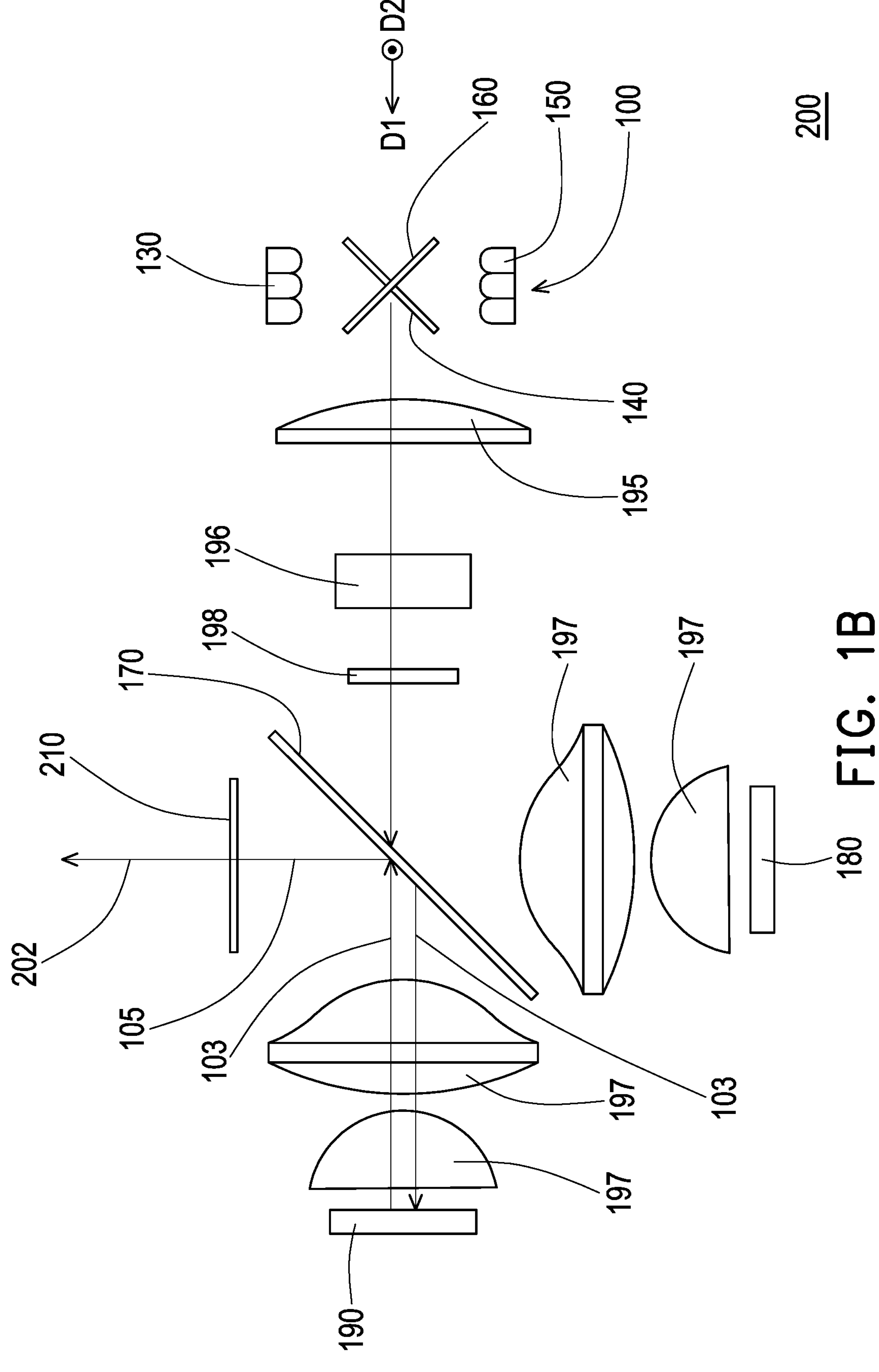
FIG. 1B is a schematic diagram of a structure of the projection apparatus shown in FIG. 1A, which illustrates a light path of an excitation light beam not through a wavelength conversion substance.
Figure 2B:
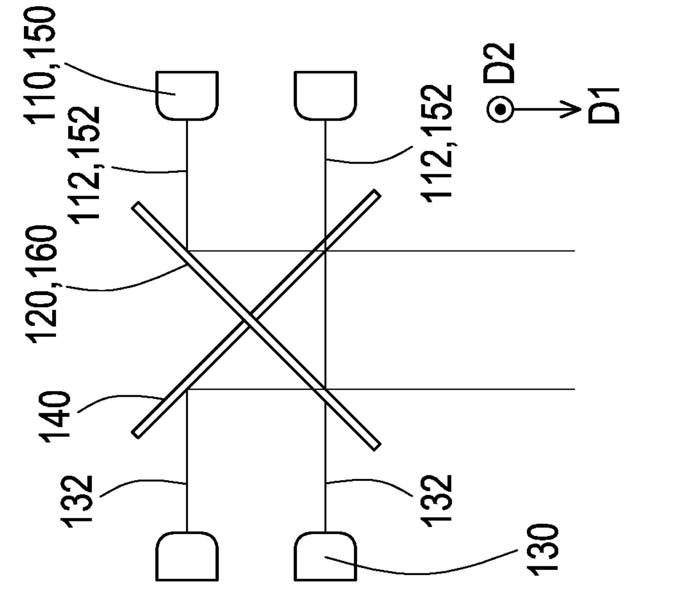
FIG. 2A, FIG. 2B, and FIG. 2C are schematic diagrams of structures of light-emitting units and reflectors of an illumination system in FIG. 1A at three different viewing angles.
Figure 2A:
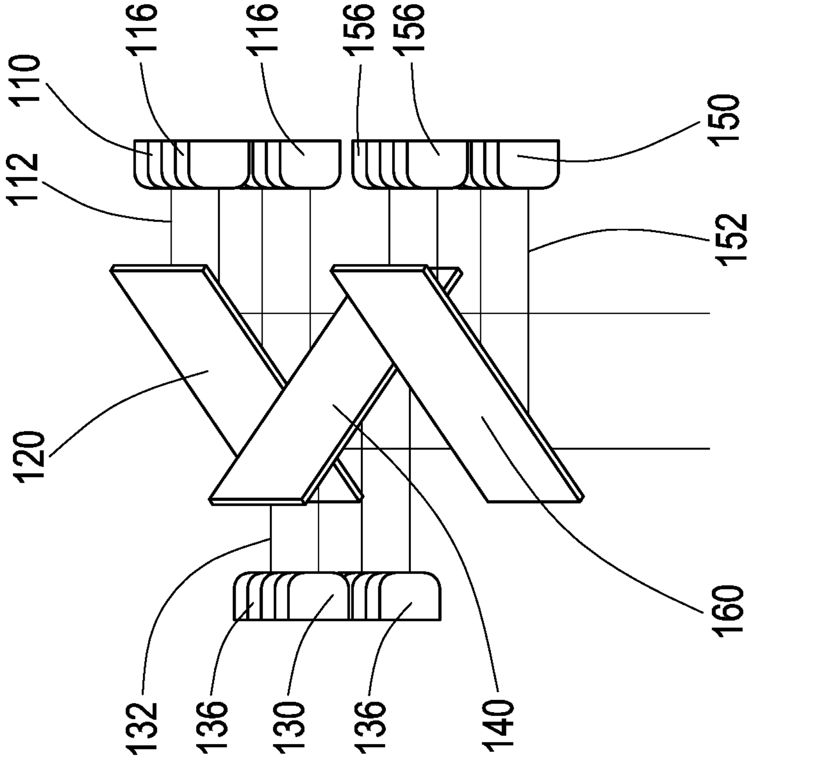
Figure 2C:
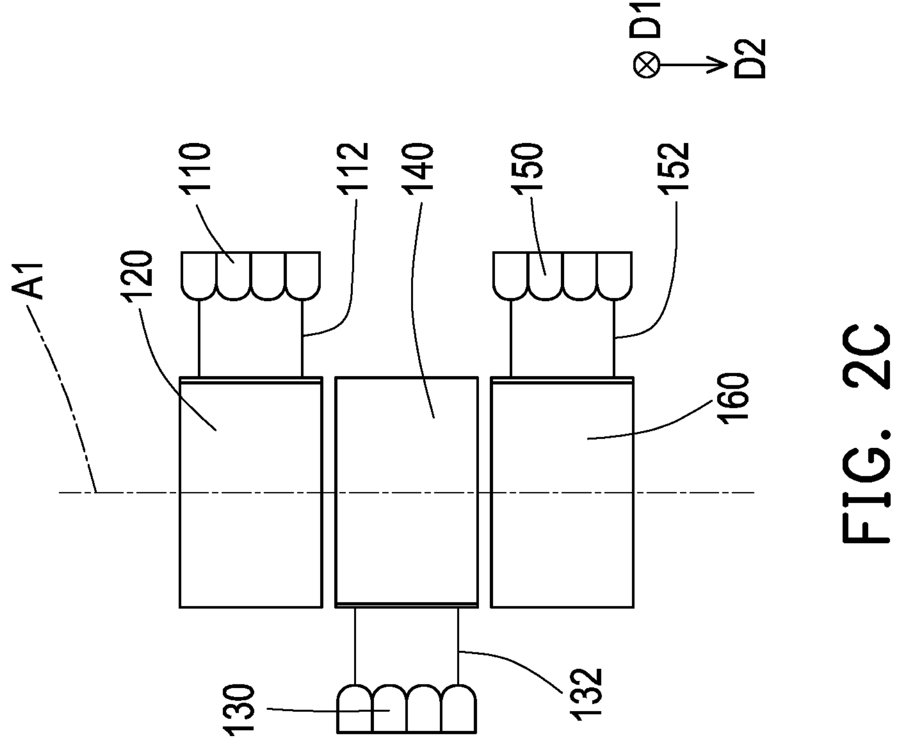

FIG. 1A is a schematic diagram of a structure of a projection apparatus according to an embodiment of the disclosure, which illustrates a light path of a conversion light beam. FIG. 1B is a schematic diagram of a structure of the projection apparatus shown in FIG. 1A, which illustrates a light path of an excitation light beam not through a wavelength conversion substance. FIG. 2A, FIG. 2B, and FIG. 2C are schematic diagrams of structures of light-emitting units and reflectors of an illumination system in FIG. 1A at three different viewing angles. Referring to FIG. 1A, FIG. 1B, and FIG. 2A to FIG. 2C, a projection apparatus 200 of this embodiment includes an illumination system 100 and a light valve 210. The illumination system 100 includes a first light-emitting unit 110, a first reflector 120, a second light-emitting unit 130, and a second reflector 140. The first light-emitting unit 110 is configured to emit a first light beam 112, and the first reflector 120 is configured to reflect the first light beam 112 toward a first direction D1. The second light-emitting unit 130 is configured to emit a second light beam 132, and the second reflector 140 is configured to reflect the second light beam 132 toward the first direction D1. The first reflector 120 and the second reflector 140 are arranged in a second direction D2, and for a view seeing along the second direction D2, the first reflector 120 and the second reflector 140 form a cross shape. The second direction D2 is perpendicular to the first direction D1.

In this embodiment, the first light-emitting unit 110 includes a plurality of laser diodes 116, and the second light-emitting unit 130 includes a plurality of laser diodes 136. However, in other embodiments, the first light-emitting unit 110 and the second light-emitting unit 130 may also include other suitable light-emitting elements, such as light-emitting diodes.

In addition, in this embodiment, the first reflector 120 and the second reflector 140 are arranged on a reference axis A1 parallel to the second direction D2 (as illustrated in FIG. 2C), and the first light-emitting unit 110 and the second light-emitting unit 130 are respectively positioned at opposite sides of the reference axis A1 but not facing each other.

In this embodiment, the illumination system 100 further includes a third light-emitting unit 150 and a third reflector 160. The third light-emitting unit 150 is configured to emit a third light beam 152, and the third reflector 160 is configured to reflect the third light beam 152 toward the first direction D1. The first reflector 120, the second reflector 140, and the third reflector 160 are arranged in the second direction D2, and for a view seeing along the second direction D2, the second reflector 140 and the third reflector 160 form a cross shape. In this embodiment, the first reflector 120 and the third reflector 160 are arranged in parallel. In this embodiment, the third light-emitting unit 150 includes a plurality of laser diodes 156. However, in other embodiments, the third light-emitting unit 150 may also include other suitable light-emitting elements, such as light-emitting diodes.

In addition, in this embodiment, the first reflector 120, the second reflector 140, and the third reflector 160 are arranged on the reference axis A1 parallel to the second direction D2 (as illustrated in FIG. 2C). In addition, the first light-emitting unit 110 and the second light-emitting unit 130 are respectively positioned at opposite sides of the reference axis A1 but not facing each other, the second light-emitting unit 130 and the third light-emitting unit 150 are respectively positioned at opposite sides of the reference axis A1 but not facing each other, and the first light-emitting unit 110 and the third light-emitting unit 150 are arranged in the second direction D2.

The light valve 210 is disposed on a transmission path of the first light beam 112 from the first reflector 120 and the second light beam 132 from the second reflector 140 and a transmission path of the third light beam 152 from the third reflector 160, so as to convert an excitation light beam 102 composed of the first light beam 112, the second light beam 132, and the third light beam 152 into an image light beam 202. In this embodiment, the light valve 210 is, for example, a liquid crystal display panel. However, in other embodiments, the light valve 210 may also be a liquid-crystal-on-silicon panel (LCOS panel), a digital micro-mirror device (DMD) or other spatial light modulators.

In the illumination system 100 and the projection apparatus 200 of this embodiment, since the first reflector 120 and the second reflector 140 forming a cross shape and the second reflector 140 and the third reflector 160 forming a cross shape are adopted, the distribution range of the flares (such as the distribution range of the flares irradiated on the light receiving lens 195) formed by the first reflector 120, the second reflector 140, and the third reflector 160 after reflecting the first light beam 112, the second light beam 132, and the third light beam 152 can be effectively reduced, so that the flares are more concentrated, thus improving the light efficiency (for example, the flares are more concentrated to the center of the light receiving lens 195, thus improving the light efficiency), and the distribution range of the flares can be made symmetrical, thus uniformizing the illumination and thereby improving the brightness uniformity of the image provided by the projection apparatus 200. In addition, due to the small distribution range of the flares, the size of the optical element may also be reduced. In addition, since the first reflector 120 and the second reflector 140 forming a cross shape and the second reflector 140 and the third reflector 160 forming a cross shape are adopted, the overall volume of the illumination system 100 and the projection apparatus 200 can be effectively reduced. In addition, the first light-emitting unit 110, the second light-emitting unit 130, and the third light-emitting unit 150 are opposite to each other but not directly facing each other, which can prevent laser light beams from striking each other and affecting the life of the laser diodes. Furthermore, the inclination angles of the first reflector 120, the second reflector 140, and the third reflector 160 may be fine-tuned to compensate for assembly errors of the first light-emitting unit 110, the second light-emitting unit 130, and the third light-emitting unit 150. In another embodiment, the second light-emitting unit 130 may be rotated 90 degrees along an axis perpendicular to the first direction D1 and the second direction D2, so that a polarization direction of the second light beam 132 is different from polarization directions of the first light beam 112 and the third light beam 152, so as to suppress the phenomenon of laser speckle in the image of the projection apparatus 200, thereby improving the brightness uniformity of the image.

However, the disclosure does not require the illumination system 100 to have the third light-emitting unit 150 and the third reflector 160. In another embodiment, the illumination system 100 may not have the third light-emitting unit 150 or the third reflector 160, but has the first light-emitting unit 110, the second light-emitting unit 130, the first reflector 120, and the second reflector 140. In this embodiment, by adopting the first reflector 120 and the second reflector 140 forming a cross shape, the distribution range of the flares formed by the first reflector 120 and the second reflector 140 after reflecting the first light beam 112 and the second light beam 132 can also be effectively reduced, so that the flares are more concentrated, thus improving the light efficiency, and the distribution range of the flares can be made symmetrical, thus uniformizing the illumination and thereby improving the brightness uniformity of the image provided by the projection apparatus 200.

In this embodiment, the illumination system 100 further includes a light splitting unit 170 disposed on a transmission path of the excitation light beam 102 composed of the first light beam 112 from the first reflector 120, the second light beam 132 from the second reflector 140, and the third light beam 152 from the third reflector 160. The light splitting unit 170 is configured to transmit a first portion 101 of the excitation light beam 102 to a wavelength conversion substance 180 (as illustrated in FIG. 1A). In this embodiment, the light splitting unit 170 is, for example, a light splitter, which reflects the excitation light beam 102 to the wavelength conversion substance 180.

The wavelength conversion substance 180 converts the first portion 101 of the excitation light beam 102 into a conversion light beam 182 transmitted back to the light splitting unit 170. In this embodiment, the wavelength conversion substance 180 is, for example, fluorescent powder, which converts the blue excitation light beam 102 into the yellow conversion light beam 182.

On the other hand, the light splitting unit 170 is configured to transmit a second portion 103 of the excitation light beam 102 to a diffusion reflector 190 (for example, the light splitting unit 170 allows the second portion 103 to pass through to transmit to the diffusion reflector 190), and the diffusion reflector 190 reflects the second portion 103 of the excitation light beam 102 to the light splitting unit 170 (as illustrated in FIG. 1B), and the light splitting unit 170 is configured to merge the conversion light beam 182 with the second portion 103 of the excitation light beam 102 into an illumination light beam 105 (that is, merging the conversion light beam 182 in FIG. 1A and the second portion 103 in FIG. 1B). In order to express the light path clearly, FIG. 1A and FIG. 1B separately illustrate the conversion light beam 182 and the second portion 103, but in fact the light paths in FIG. 1A and FIG. 1B may exist at the same time, for example, the conversion light beam 182 and the second portion 103 may exist simultaneously to form the illumination light beam 105. In an embodiment, the blue second portion 103 and the yellow conversion light beam 182 may synthesize the white illumination light beam 105, and the first light beam 112, the second light beam 132, and the third light beam 152 may have the same and single wavelength, but the disclosure is not limited thereto. The light valve 210 is disposed on a transmission path of the illumination light beam 105 to convert the illumination light beam 105 into the image light beam 202. The image light beam 202 may be projected on a screen through a projection lens to form a display image. In addition, in this embodiment, at least one lens 197 (a plurality of lenses 197 are shown as an example in FIG. 1A and FIG. 1B) may be provided on the light paths of the first portion 101 and the second portion 103, so as to achieve the effect of light beam convergence.

Furthermore, in this embodiment, a collimation lens 196 and a light uniformizing element 198 may also be disposed in sequence on the light path between the light receiving lens 195 and the light splitting unit 170. The light receiving lens 195 and the collimation lens 196 may form an afocal system to reduce the overall distribution width of the first light beam 112, the second light beam 132, and the third light beam 152. The light uniformizing element 198 is, for example, a fly-eye lens or a diffuser, which can uniformize the first light beam 112, the second light beam 132, and the third light beam 152. In another embodiment, since the first reflector 120 and the second reflector 140 forming a cross shape and the second reflector 140 and the third reflector 160 forming a cross shape are adopted, the distribution range of the flares formed by the first reflector 120, the second reflector 140, and the third reflector 160 after reflecting the first light beam 112, the second light beam 132, and the third light beam 152 can be effectively reduced, so the afocal system may not be adopted to further narrow the distribution range of the flares. In addition, since the light emitted by the laser light source may be polarized, the whole of the first reflector 120, the second reflector 140, the third reflector 160, the first light-emitting unit 110, the second light-emitting unit 130, and the third light-emitting unit 150 may rotate about an axis parallel to the first direction D1 (for example, the axis coincident with the excitation light beam marked 102 in FIG. 1A) to an appropriate angle to change the polarity of the laser beam entering the system, thereby improving the uniformity of the image.

Figure 4:
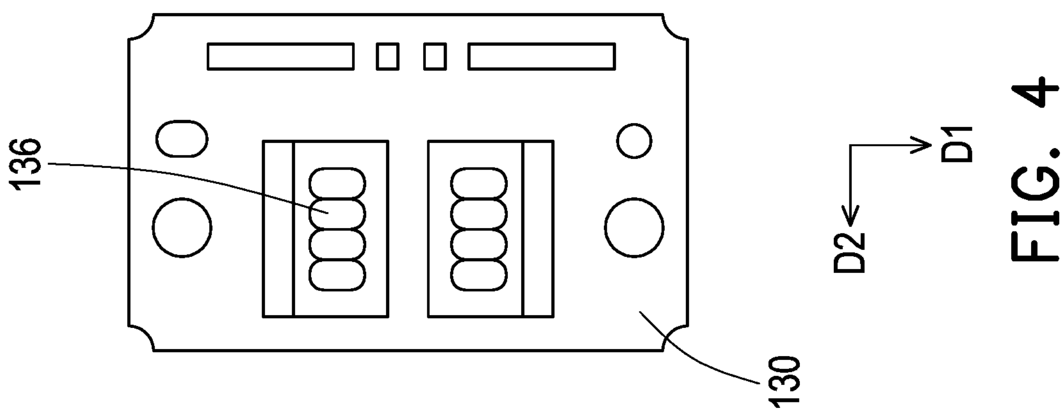
FIG. 4 is a schematic diagram of a front view of a second light-emitting unit in FIG. 2A.
Figure 3:
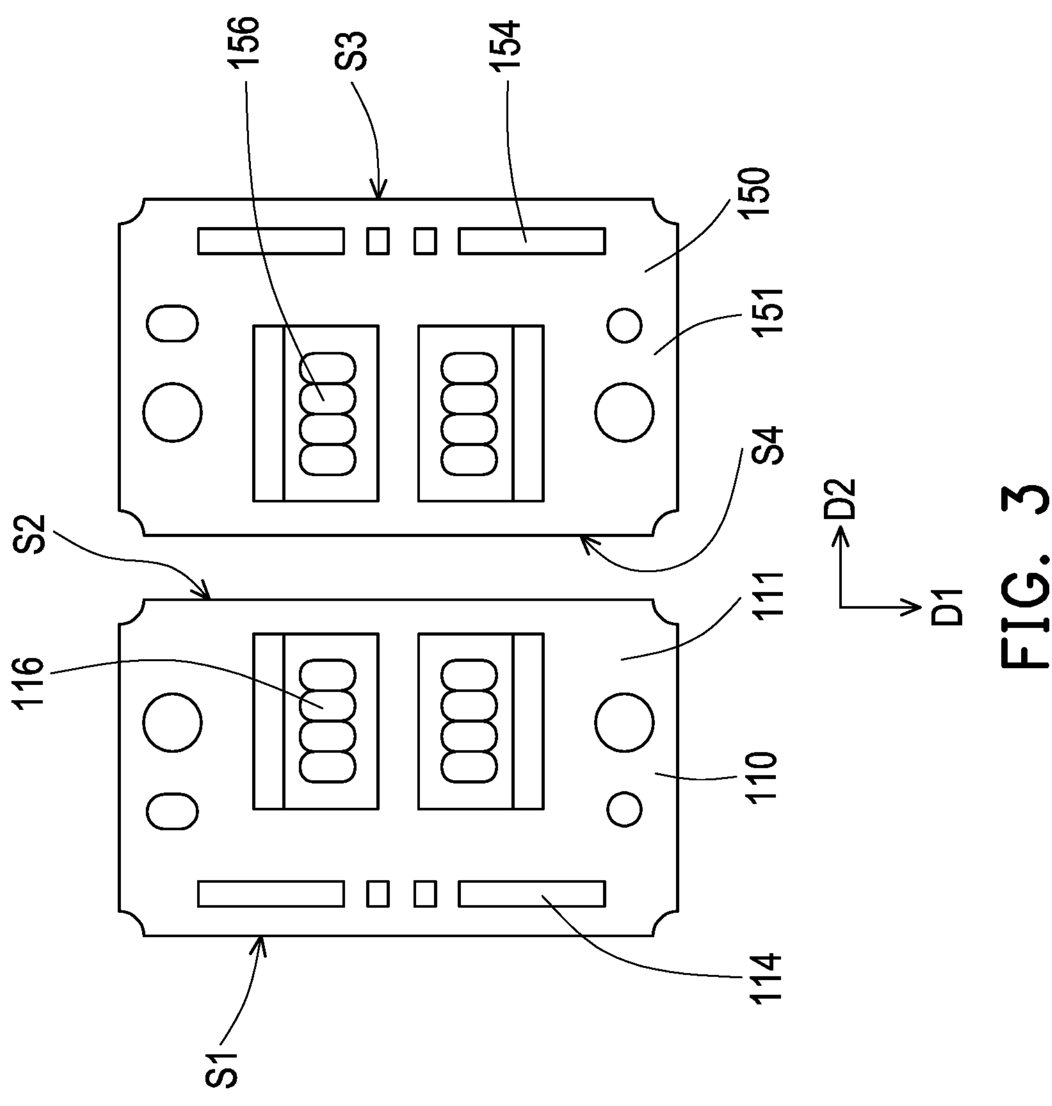
FIG. 3 is a schematic diagram of a front view of a first light-emitting unit and a third light-emitting unit in FIG. 2A.

FIG. 3 is a schematic diagram of a front view of a first light-emitting unit and a third light-emitting unit in FIG. 2A, and FIG. 4 is a schematic diagram of a front view of a second light-emitting unit in FIG. 2A. Please refer to FIG. 2A to FIG. 2C, FIG. 3, and FIG. 4. In this embodiment, the first light-emitting unit 110 includes a first substrate 111, a plurality of first pads 114, and a plurality of laser diodes 116. The first substrate 111 has a first side S1 and a second side S2 opposite to each other. The plurality of first pads 114 are disposed on the first substrate 111 and adjacent to the first side S1. The plurality of laser diodes 116 are disposed on the first substrate 111 and displaced toward the second side S2. The third light-emitting unit 150 includes a second substrate 151, a plurality of second pads 154, and a plurality of laser diodes 156. The second substrate 151 has a third side S3 and a fourth side S4 opposite to each other. The plurality of second pads 154 are disposed on the second substrate 151 and adjacent to the third side S3. The plurality of laser diodes 156 are disposed on the second substrate 151 and displaced toward the fourth side S4. The second side S2 is positioned between the first side S1 and the fourth side S4, and the fourth side S4 is positioned between the second side S2 and the third side S3.

In this embodiment, the second light-emitting unit 130 includes a plurality of laser diodes 136 facing a space between the second side S2 and the fourth side S4. In this embodiment, since the second side S2 close to the laser diode 116 and the fourth side S4 close to the laser diode 156 are disposed adjacent to each other, and the space between the second side S2 and the fourth side S4 faces the laser diode 136, the distribution range of the flares formed by the first reflector 120, the second reflector 140, and the third reflector 160 after reflecting the first light beam 112, the second light beam 132, and the third light beam 152 can be further reduced.

In this embodiment, the first light-emitting unit 110, the second light-emitting unit 130, and the third light-emitting unit 150 each include at least one row of laser diodes (two rows of laser diodes are shown as an example in FIG. 2A to FIG. 2C, FIG. 3, and FIG. 4). Each row of laser diodes (such as laser diodes 116, 136 or 156) is arranged along the second direction D2. With the first light-emitting unit 110, the second light-emitting unit 130, and third light-emitting unit 150 adopting different combinations of one row or two rows of laser diodes, and with the first light-emitting unit 110, the second light-emitting unit 130, and the third light-emitting unit 150 adopting different combinations of powers respectively, in this embodiment, various illumination systems 100 with different wattages may be generated to meet various usage requirements. Through different combinations of the wattages of the first light-emitting unit 110, the second light-emitting unit 130, and the third light-emitting unit 150, it is possible to use different total wattages to achieve different brightness requirements of the projection apparatus 200 under the same volume and the same structure, thereby saving costs caused by structural changes.

In summary, in the illumination system and the projection apparatus of the embodiment of the disclosure, since the first reflector and the second reflector forming a cross shape are adopted, the distribution range of the flares formed by the first reflector and the second reflector after reflecting the first light beam and the second light beam can be effectively reduced, so that the flares are more concentrated, thus improving the light efficiency, and the distribution range of the flares can be made symmetrical, thus uniformizing the illumination and thereby improving the brightness uniformity of the image provided by the projection apparatus.

What is claimed is:

1. An illumination system, comprising:

a first light-emitting unit configured to emit a first light beam;

a first reflector configured to reflect the first light beam toward a first direction;

a second light-emitting unit configured to emit a second light beam;

a second reflector configured to reflect the second light beam toward the first direction, wherein the first reflector and the second reflector are arranged in a second direction, and for a view seeing along the second direction, the first reflector and the second reflector form a cross shape, wherein the second direction is perpendicular to the first direction, the first light beam is reflected by the first reflector without being transmitted to the second reflector, and the second light beam is reflected by the second reflector without being transmitted to the first reflector;

a third light-emitting unit configured to emit a third light beam; and a third reflector configured to reflect the third light beam toward the first direction, wherein the first reflector, the second reflector, and the third reflector are arranged in the second direction, and for the view seeing along the second direction, the second reflector and the third reflector form a cross shape.

2. The illumination system according to claim 1, wherein the first light-emitting unit comprises a plurality of laser diodes, and the second light-emitting unit comprises a plurality of laser diodes.

3. The illumination system according to claim 1, wherein the first reflector and the second reflector are arranged on a reference axis parallel to the second direction, and the first light-emitting unit and the second light-emitting unit are respectively positioned at opposite sides of the reference axis but not facing each other.

4. The illumination system according to claim 1, wherein the first reflector and the third reflector are arranged in parallel.

5. The illumination system according to claim 1, wherein the first reflector, the second reflector, and the third reflector are arranged on a reference axis parallel to the second direction, the first light-emitting unit and the second light-emitting unit are respectively positioned at opposite sides of the reference axis but not facing each other, the second light-emitting unit and the third light-emitting unit are respectively positioned at opposite sides of the reference axis but not facing each other, and the first light-emitting unit and the third light-emitting unit are arranged in the second direction.

6. The illumination system according to claim 1, wherein the first light-emitting unit comprises:

a first substrate having a first side and a second side opposite to each other;

a plurality of first pads disposed on the first substrate and adjacent to the first side; and a plurality of first laser diodes disposed on the first substrate and displaced toward the second side, and the third light-emitting unit comprises:

a second substrate having a third side and a fourth side opposite to each other;

a plurality of second pads disposed on the second substrate and adjacent to the third side; and a plurality of second laser diodes disposed on the second substrate and displaced toward the fourth side, wherein the second side is positioned between the first side and the fourth side, and the fourth side is positioned between the second side and the third side.

7. The illumination system according to claim 6, wherein the second light-emitting unit comprises a plurality of third laser diodes facing a space between the second side and the fourth side.

8. The illumination system according to claim 1, wherein the first light-emitting unit and the second light-emitting unit comprise at least one row of laser diodes, and the at least one row of laser diodes is arranged along the second direction.

9. The illumination system according to claim 1, further comprising a light splitting unit disposed on a transmission path of an excitation light beam composed of the first light beam from the first reflector, the second light beam from the second reflector, and the third light beam from the third reflector, the light splitting unit is configured to transmit a first portion of the excitation light beam to a wavelength conversion substance, and the wavelength conversion substance converts the first portion of the excitation light beam into a conversion light beam transmitted back to the light splitting unit, the light splitting unit is configured to transmit a second portion of the excitation light beam to a diffusion reflector, the diffusion reflector reflects the second portion of the excitation light beam to the light splitting unit, and the light splitting unit is configured to merge the conversion light beam with the second portion of the excitation light beam into an illumination light beam.

10. A projection apparatus, comprising:

an illumination system comprising:

a first light-emitting unit configured to emit a first light beam;

a first reflector configured to reflect the first light beam toward a first direction;

a second light-emitting unit configured to emit a second light beam;

a second reflector configured to reflect the second light beam toward the first direction, wherein the first reflector and the second reflector are arranged in a second direction, and for a view seeing along the second direction, the first reflector and the second reflector form a cross shape, wherein the second direction is perpendicular to the first direction, the first light beam is reflected by the first reflector without being transmitted to the second reflector, and the second light beam is reflected by the second reflector without being transmitted to the first reflector;

a third light-emitting unit configured to emit a third light beam; and a third reflector configured to reflect the third light beam toward the first direction, wherein the first reflector, the second reflector, and the third reflector are arranged in the second direction, for the view seeing along the second direction, the second reflector and the third reflector form a cross shape; and a light valve disposed on a transmission path of the first light beam from the first reflector, the second light beam from the second reflector, and the third light beam from the third reflector to convert the first light beam, the second light beam, and the third light beam into an image light beam.

11. The projection apparatus according to claim 10, wherein the first light-emitting unit comprises a plurality of laser diodes, and the second light-emitting unit comprises a plurality of laser diodes.

12. The projection apparatus according to claim 10, wherein the first reflector and the second reflector are arranged on a reference axis parallel to the second direction, and the first light-emitting unit and the second light-emitting unit are respectively positioned at opposite sides of the reference axis but not facing each other.

13. The projection apparatus according to claim 10, wherein the first reflector and the third reflector are arranged in parallel.

14. The projection apparatus according to claim 10, wherein the first reflector, the second reflector, and the third reflector are arranged on a reference axis parallel to the second direction, the first light-emitting unit and the second light-emitting unit are respectively positioned at opposite sides of the reference axis but not facing each other, the second light-emitting unit and the third light-emitting unit are respectively positioned at opposite sides of the reference axis but not facing each other, and the first light-emitting unit and the third light-emitting unit are arranged in the second direction.

15. The projection apparatus according to claim 10, wherein the first light-emitting unit comprises:

a first substrate having a first side and a second side opposite to each other;

a plurality of first pads disposed on the first substrate and adjacent to the first side; and a plurality of first laser diodes disposed on the first substrate and displaced toward the second side, and the third light-emitting unit comprises:

a second substrate having a third side and a fourth side opposite to each other;

a plurality of second pads disposed on the second substrate and adjacent to the third side; and a plurality of second laser diodes disposed on the second substrate and displaced toward the fourth side, wherein the second side is positioned between the first side and the fourth side, and the fourth side is positioned between the second side and the third side.

16. The projection apparatus according to claim 15, wherein the second light-emitting unit comprises a plurality of third laser diodes facing a space between the second side and the fourth side.

17. The projection apparatus according to claim 10, wherein the first light-emitting unit and the second light-emitting unit comprise at least one row of laser diodes, and the at least one row of laser diodes is arranged along the second direction.

18. The projection apparatus according to claim 10, wherein the illumination system further comprises a light splitting unit disposed on a transmission path of an excitation light beam composed of the first light beam from the first reflector, the second light beam from the second reflector, and the third light beam from the third reflector, the light splitting unit is configured to transmit a first portion of the excitation light beam to a wavelength conversion substance, and the wavelength conversion substance converts the first portion of the excitation light beam into a conversion light beam transmitted back to the light splitting unit, the light splitting unit is configured to transmit a second portion of the excitation light beam to a diffusion reflector, the diffusion reflector reflects the second portion of the excitation light beam to the light splitting unit, and the light splitting unit is configured to merge the conversion light beam with the second portion of the excitation light beam into an illumination light beam, and the light valve is disposed on a transmission path of the illumination light beam to convert the illumination light beam into the image light beam.

* * * * *